United States Patent
Lee

(10) Patent No.: US 10,848,696 B2
(45) Date of Patent: Nov. 24, 2020

(54) APPARATUS FOR ENCODING IMAGE, APPARATUS FOR DECODING IMAGE AND IMAGE SENSOR

(71) Applicant: Samsung Electronics Co., Ltd., Suwon-si, Gyeonggi-do (KR)

(72) Inventor: Wonseok Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/288,815

(22) Filed: Feb. 28, 2019

(65) Prior Publication Data
US 2019/0373189 A1     Dec. 5, 2019

(30) Foreign Application Priority Data
Jun. 1, 2018    (KR) .................. 10-2018-0063230

(51) Int. Cl.
| | |
|---|---|
| *H04N 19/182* | (2014.01) |
| *H04N 5/367* | (2011.01) |
| *G06T 9/00* | (2006.01) |
| *H04N 19/186* | (2014.01) |

(52) U.S. Cl.
CPC ............. *H04N 5/367* (2013.01); *G06T 9/00* (2013.01); *H04N 19/182* (2014.11); *H04N 19/186* (2014.11)

(58) Field of Classification Search
None
See application file for complete search history.

(56) References Cited

U.S. PATENT DOCUMENTS

| | | |
|---|---|---|
| 8,237,825 B2 | 8/2012 | Wright et al. |
| 8,378,859 B2 | 2/2013 | Frederiksen et al. |
| 9,232,221 B2 | 1/2016 | Lee et al. |
| 9,736,384 B2 | 8/2017 | Newman |
| 2004/0032516 A1 | 2/2004 | Kakarala |
| 2009/0123066 A1* | 5/2009 | Moriya ............... H04N 19/139 382/166 |
| 2015/0003707 A1 | 1/2015 | Amon et al. |
| 2015/0195462 A1 | 7/2015 | Kano |
| 2015/0201200 A1 | 7/2015 | Cheong et al. |
| 2016/0119570 A1 | 4/2016 | Wong et al. |
| 2016/0165236 A1* | 6/2016 | Ikeda ................. H04N 19/159 375/240.13 |
| 2017/0353680 A1 | 12/2017 | Fukuda |

FOREIGN PATENT DOCUMENTS

KR    10-2017-0137633 A    12/2017

* cited by examiner

*Primary Examiner* — Christopher G Findley
(74) *Attorney, Agent, or Firm* — Harness, Dickey & Pierce, P.L.C.

(57) ABSTRACT

An image encoding apparatus includes a compressor that generates a bitstream including encoded data corresponding to values of original pixels, based on one of encoding modes, and a reconstructor that generates values of reference pixels by reconstructing the bitstream. In a first mode of the encoding modes, the compressor generates the bitstream based on a difference value between each of the values of the original pixels and a reference value which is based on at least one of the values of the reference pixels. In a second mode of the encoding modes, the compressor generates the bitstream based on an average value of at least two of the values of the original pixels.

20 Claims, 9 Drawing Sheets

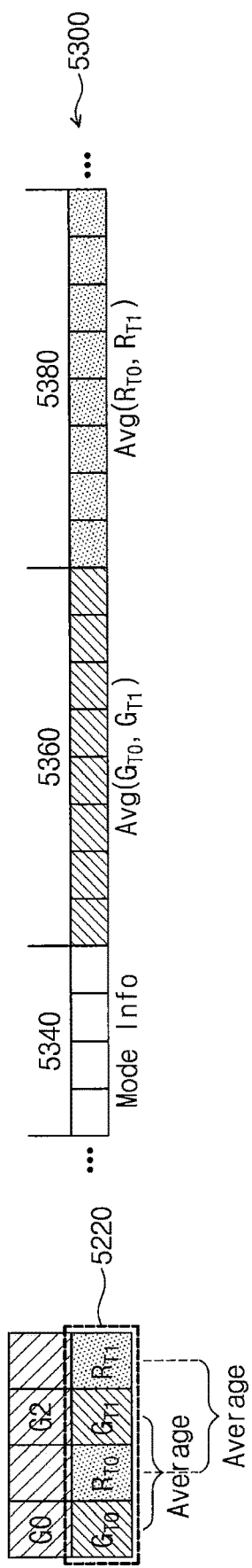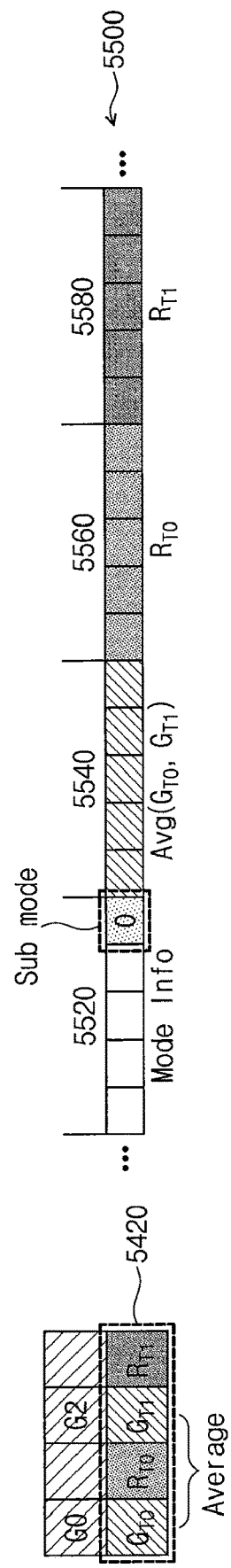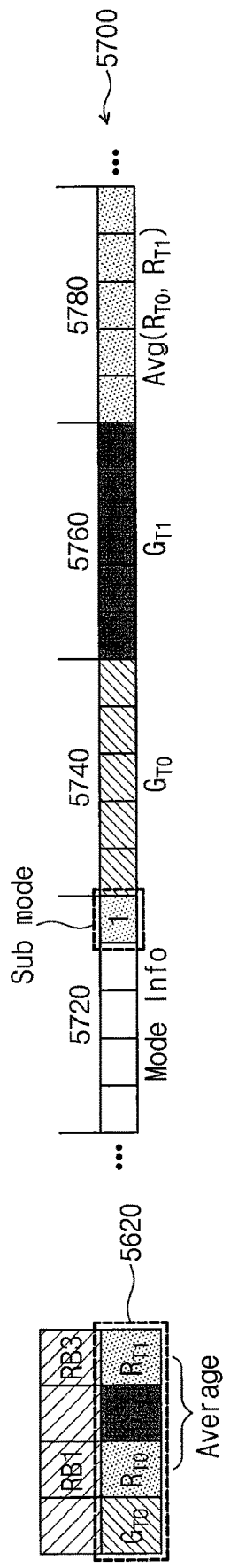

| Mode | Method | Shift G | Shift R/B |
|---|---|---|---|
| 0 | DPCM | 0 | 0 |
| 1 | DPCM | 1 | 1 |
| 2 | DPCM | 2 | 2 |
| 3 | DPCM | 2 | 3 |
| 4 | DPCM | 3 | 3 |
| 5 | DPCM | 3 | 4 |
| 6 | DPCM | 4 | 4 |
| 7 | DPCM | 4 | 5 |
| 8 | DPCM | 5 | 5 |
| 9 | DPCM | 5 | 6 |
| 10 | Average | 2 | 2 |
| 11 | Average | 5 | 5 |
| 12 | PCM | Input pixel bit-N-bit | Input pixel bit-N-bit |

APPARATUS FOR ENCODING IMAGE, APPARATUS FOR DECODING IMAGE AND IMAGE SENSOR

CROSS-REFERENCE TO RELATED APPLICATIONS

This U. S. non-provisional application claims the benefit of priority under 35 U.S.C. § 119 to Korean Patent Application No. 10-2018-0063230 filed on Jun. 1, 2018, in the Korean Intellectual Property Office (KIPO), the disclosure of which is incorporated by reference herein in their entireties.

BACKGROUND

Various example embodiments of the inventive concepts described herein relate to an electronic apparatus, system, and/or method, and more particularly, relate to an apparatus, system, and/or method for encoding an image and an apparatus, system, and/or method for decoding an image.

Image encoding and/or image compression may refer to the process of generating encoded image data, the size of which is smaller than that of the original image data, from the original image data. Also, image decoding and/or image decompression may refer to the process of generating reconstructed image data by decoding the encoded image data and/or a bitstream. The reconstructed image data may be the same as, or different from, the original image data depending on the encoding and decoding scheme.

Nowadays, as dual cameras are mounted on various electronic apparatuses and/or the number of images which may be captured per second increases, the size of image data which are stored in the electronic apparatuses is increasing.

SUMMARY

Various example embodiments of the inventive concepts provide an apparatus, system, and/or method for encoding an original image of a Bayer pattern, an apparatus, system, and/or method for decoding the encoded image, and/or an image sensor.

The technical problems to be solved by various example embodiments of the inventive concepts are not limited to the above-described technical problems, and other technical problems can be deduced from the following example embodiments.

According to at least one example embodiment, an image encoding apparatus may include a at least one processor configured to receive one or more original pixels, and generate a compressed bitstream including encoded data corresponding to values of the one or more original pixels, based on an encoding mode selected from a plurality of encoding modes, the generating including generating the compressed bitstream based on a difference value between each of the values of the original pixels and a reference value, the reference value is based on at least one of the values of one or more reference pixels previously encoded and reconstructed, in response to the encoding mode being a first mode of the plurality of encoding modes, and generating the compressed bitstream based on an average value of at least two of the values of the original pixels in response to the encoding mode being a second mode of the plurality of encoding modes.

According to at least one example embodiment, an image decoding apparatus may include at least one processor configured to receive a bitstream including an encoding mode selected from a plurality of encoding modes, and generate values of one or more reconstruction pixels corresponding to values of one or more original pixels based on the received bitstream, the generating including, decoding the bitstream based on a difference value included in the bitstream and a reference value, the reference value is based on at least one value of one or more previously decoded reference pixels, in response to the encoding mode being a first mode of the plurality of encoding modes, decoding the bitstream based on an average value received from the bitstream in response to the encoding mode being a second mode of the plurality of encoding modes, and the difference value indicates a difference between each of the values of the one or more original pixels and the reference value, and the average value is a value obtained by averaging at least two of the values of the one or more original pixels.

According to an exemplary embodiment, an image sensor connected with an memory may include an encoder that generates encoded data corresponding to values of original pixels of a Bayer color pattern based on one of encoding modes, a memory controller that controls an operation of inputting and outputting the encoded data to and from the memory, and a decoder that generates values of reconstruction pixels corresponding to the values of the original pixels by decoding the encoded data output from the memory. In a first mode of the encoding modes, the encoder may generate the encoded data based on a difference value between each of the values of the original pixels and a reference value which is based on at least one of the values of the reference pixels previously encoded and reconstructed. In a second mode of the encoding modes, the encoder may generate the encoded data based on an average value of at least two of the values of the original pixels.

BRIEF DESCRIPTION OF THE FIGURES

The above and other objects and features of the inventive concepts will become apparent by describing in detail various example embodiments thereof with reference to the accompanying drawings.

FIG. 2 is a diagram illustrating an image of a Bayer pattern obtained through a Bayer color filter, according to at least one example embodiment.

FIG. 5A is a diagram illustrating an operation in which an encoder of FIG. 3 encodes pieces of original pixel data based on an average mode, according to at least one example embodiment.

FIG. 5B is a diagram illustrating an operation in which an encoder of FIG. 3 encodes pieces of original pixel data based on an average mode, according to at least one other example embodiment.

FIG. 5C is a diagram illustrating an operation in which an encoder of FIG. 3 encodes pieces of original pixel data based on an average mode, according to at least one other example embodiment.

FIG. 6 is a table illustrating information about encoding modes to be used in an image processing apparatus of FIG. 1, according to at least one example embodiment.

DETAILED DESCRIPTION

Below, various example embodiments of the inventive concepts will be described in detail and clearly to such an extent that those (hereinafter referred to as "ordinary those") skilled in the art may implement one or more of the inventive concepts.

Figure 1:
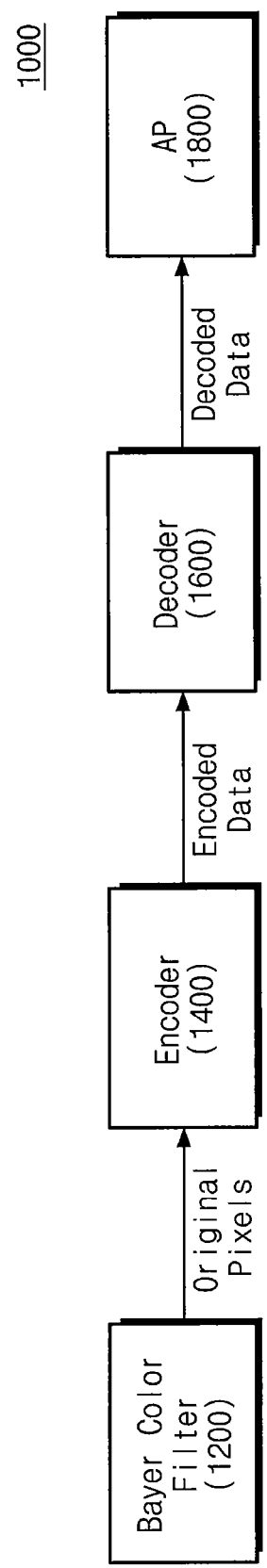
FIG. 1 is a block diagram illustrating an image processing apparatus according to at least one example embodiment.
Figure 2:
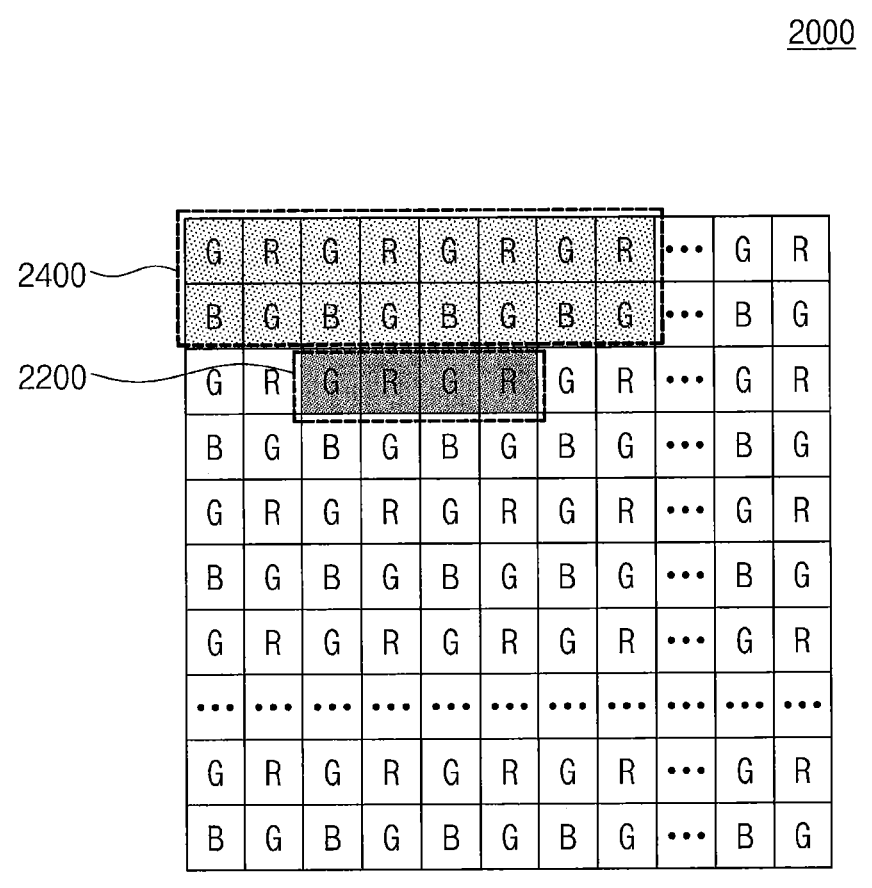

FIG. 1 is a block diagram illustrating an image processing apparatus according to at least one example embodiment. FIG. 2 is a diagram illustrating an image of a Bayer pattern obtained through a Bayer color filter, according to at least one example embodiment.

An image processing apparatus 1000 is an electronic apparatus which may capture and/or store an image associated with at least one subject by using a solid state image sensor such as a complementary metal-oxide semiconductor (CMOS) image sensor, etc. The image processing apparatus 1000 may be a digital camera, a digital camcorder, a mobile phone, and/or a tablet computer, etc., but is not limited thereto.

Referring to FIG. 1, the image processing apparatus 1000 may include a Bayer color filter 1200, an encoder 1400, a decoder 1600, and/or an application processor 1800, etc., but is not limited thereto. Modules illustrated in FIG. 1 may be implemented with one processor or a plurality of processors, one or more processors including a plurality of processing cores, application specific processing devices (e.g., ASICs, FPGAs, etc.), and/or may be independently implemented with a plurality of different types of processors.

The Bayer color filter 1200 may obtain pieces of original pixel data from a light signal. The pieces of original pixel data may include a pixel value of an original pixel. A Bayer pattern depends on the condition that an eye of a person deduces most of luminance data from a green component of a subject. For example, 50% of pixels included in the Bayer color filter 1200 may detect a green signal, 25% of the pixels may detect a red signal, and 25% of the pixels may detect a blue signal. According to at least one example embodiment, the Bayer color filter 1200 may have a configuration in which, for example, 2-by-2 cell patterns each including a red (R) pixel, a blue (B) pixel, and two green (G) pixels are repeatedly arranged, but the example embodiments are not limited thereto, for example the cell patterns may be a different sized cell pattern. According to another example embodiment, the Bayer color filter 1200 may have a configuration in which, for example, 2-by-2 cell patterns each including a red pixel, a blue pixel, and two wide green (W) pixels is repeatedly arranged, but the example embodiments are not limited thereto.

The encoder 1400 may compress pieces of original pixel data obtained through the Bayer color filter 1200, thereby reducing the size of image data. Referring to FIG. 2, a Bayer image 2000 indicates pieces of original pixel data of a Bayer pattern obtained through the Bayer color filter 1200 according to at least one example embodiment. According to at least one example embodiment, the encoder 1400 may generate encoded data associated with the pieces of original pixel data 2200 by using pieces of reference pixel data 2400. Additionally, the encoder 1400 may generate the encoded data by using an average value of the pieces of original pixel data 2200 without using the pieces of reference pixel data 2400.

The encoder 1400 may determine pieces of original pixel data, which are successive as much as the reference number, as one encoding unit (and/or channel), like the pieces of original pixel data 2200 of FIG. 2. Pieces of original pixel data included in one encoding unit may be encoded to a bitstream which is composed of a mode region for storing information about an encoding mode and/or a pixel region for storing encoded data associated with a value of original pixels, but is not limited thereto.

An operation of the encoder 1400 will be more fully described with reference to FIGS. 3 to 7 according to some example embodiments.

Returning to FIG. 1, the decoder 1600 may receive encoded data (i.e., a bitstream) generated by the encoder 1400 and may generate decoded data by performing at least one decoding operation on the received encoding data. The decoder 1600 may transfer the decoded data to the application processor 1800, but is not limited thereto. An operation of the decoder 1600 will be more fully described with reference to FIGS. 8 to 11.

The application processor 1800 may be a central processing unit (CPU), a microprocessor, and/or a micro controller unit (MCU), that has been specially configured and/or is specially programmed to perform post processing on the decoded data. The application processor 1800 may perform post processing on pieces of decoded data received from the decoder 1600. The post processing may mean applying an image enhancement algorithm to image artifacts, etc., but is not limited thereto. For example, the application processor 1800 may perform, but is not limited to, white balancing, denoising, demosaicking, lens shading, and/or gamma corrections, etc., on the received decoded data.

Below, the term "pixel" or "pixel value" may mean information and/or a value output and/or obtained from a light signal through pixel elements constituting the Bayer color filter 1200. Below, the term "original pixels" may mean pixel values of unit original pixels to be currently encoded and/or decoded. Below, the term "reference pixels" may mean pixel values of pixels to be referenced for the encoding of original pixels. Below, the term "reconstruction pixels" may mean pixel values of reconstruction pixels generated by decoding encoded data associated with original pixels.

Figure 3:
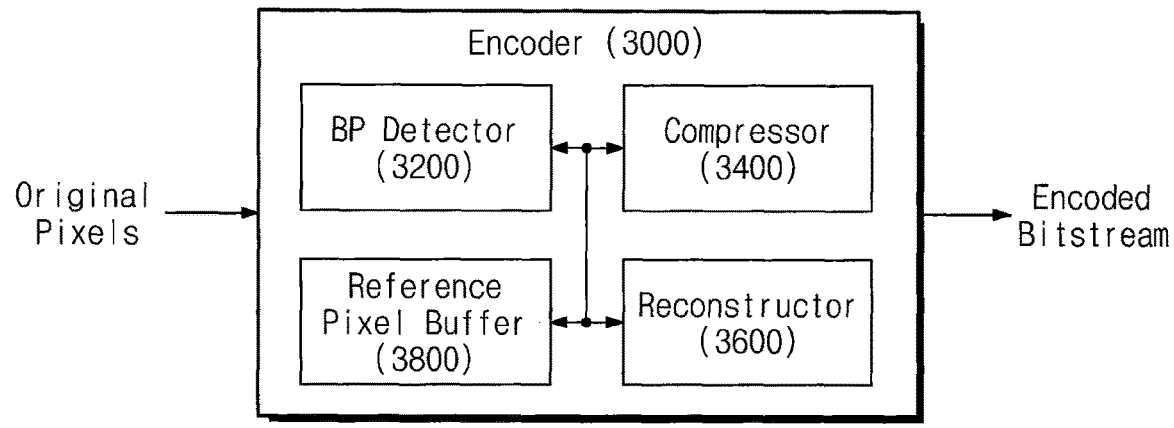
FIG. 3 is a block diagram illustrating an encoder according to at least one example embodiment.

FIG. 3 is a block diagram illustrating an encoder according to at least one example embodiment.

An encoder 3000 may output a bitstream including encoded data by compressing received original pixels. The encoder 3000 corresponds to the at least one example embodiment of the encoder 1400 of FIG. 1. Accordingly, even though omitted below, the above description given with regard to the encoder 1400 of FIG. 1 may be applied to the encoder 3000 of FIG. 3.

Referring to FIG. 3, the encoder 3000 may include a bad pixel detector 3200, a compressor 3400, a reconstructor 3600, and/or a reference pixel buffer 3800, but the example embodiments are not limited thereto. The encoder 3000 may include a central processor (not illustrated) and/or other special purpose processor which controls the bad pixel detector 3200, the compressor 3400, the reconstructor 3600, and/or the reference pixel buffer 3800, etc., overall. Additionally, each of the bad pixel detector 3200, the compressor 3400, the reconstructor 3600, and/or the reference pixel buffer 3800, etc., may be operated by its own processor (not illustrated), and the encoder 3000 may be overall operated as the processors (not illustrated) operate mutually and/or in a parallel or distributed manner. Additionally, the bad pixel detector 3200, the compressor 3400, the reconstructor 3600, and/or the reference pixel buffer 3800, etc., may be controlled under control of an external processor (not illustrated) of the encoder 3000.

The Bad pixel detector 3200 may detect a bad pixel which is present in one or more pieces of pixel data obtained by the Bayer color filter 1200. For example, the bad pixel may include a static bad pixel caused by a physical error existing at a specific location of the Bayer color filter 1200 and/or a dynamic bad pixel that was caused irregularly and/or intermittently. According to at least one example embodiment, the bad pixel detector 3200 may compare signal levels of a plurality of pixels arranged in a horizontal direction with respect to a pixel to be tested and may determine whether the pixel targeted for a test operation is included in an edge region of the whole image; in the case where the pixel to be tested is not included in the edge region, the bad pixel detector 3200 may determine whether the pixel to be tested is defective, or in other words, whether the pixel value output by a corresponding pixel of the Bayer color filter is inaccurate and/or producing improper pixel values. According to at least one example embodiment, a bad pixel may be detected by comparing signal levels of surrounding pixels of the target pixel. The bad pixel detector 3200 may tag attribute information (e.g., a flag, metadata, etc.) indicating a bad pixel to pixels which are determined as a bad pixel.

The compressor 3400 may perform encoding (e.g., compression) on original pixels, but is not limited thereto. According to at least one example embodiment, original pixels received by the compressor 3400 may be pixels which are marked by the bad pixel detector 3200 so as to indicate whether original pixels are bad pixels (e.g., pixels that). The compressor 3400 may generate a bitstream (e.g., a compressed bitstream) including encoded data of an original pixel based on one of a plurality of encoding modes. The encoding modes may include a differential pulse code modulation (DPCM) mode in which encoding is performed based on a difference value between a value of each of the original pixels and a reference value determined from one reference pixel; and an average mode in which encoding is performed based on an average value of values of the original pixels. The reference pixel used in the DPCM mode may refer to a previously encoded original pixel, and information about the reference pixel may be read from the reference pixel buffer 3800. The encoding operation of the compressor 3400 will be more fully described with reference to FIGS. 4 to 7.

According to at least one example embodiment, the reconstructor 3600 may generate reference pixels by reconstructing the encoded data output from the compressor 3400. The expression "to refer to a previously encoded pixel" may mean to use a decoded pixel generated from an encoded original pixel, and not to use the original pixel itself as a reference pixel. With regard to the original pixel, information about an original pixel and information about an encoded pixel and a decoded pixel from an original pixel may be present in the encoder 3000, but a decoder (e.g., 1600 of FIG. 1, etc.) does not/cannot know information about the original pixel. That is, in the case where the encoder 3000 uses a previous original pixel as a reference pixel, since the decoder cannot know information about the previous original pixel referenced by the encoder 3000, the results of reconstruction of the original pixel may vary, and a mismatch may occur between the encoder 3000 and the decoder. Accordingly, the encoder 3000 should use a pixel, which is again reconstructed from previously encoded original pixels, as a reference pixel.

The reconstructor 3600 may store the reconstructed pixel to a memory (not illustrated). The memory (not illustrated) may include a volatile memory such as a dynamic random access memory (DRAM) and/or a static RAM (SRAM), etc., and/or a nonvolatile memory such as a phase-change random access memory (PRAM), a magnetic random access memory (MRAM), a resistive RAM (ReRAM), and/or a ferroelectric RAM (FRAM), etc.

The reference pixel buffer 3800 may extract information about at least one reference pixel for encoding of current original pixels from the memory (not illustrated). A reference pixel may be neighborhood pixels of original pixels, or in other words, the one or more reference pixels may be one or pixels neighboring the one or more original pixels. According to at least one example embodiment, the reference pixel buffer 3800 may be composed of line memories (e.g., lines of memories) for storing pixel values of neighborhood pixels of original pixels desired and/or necessary for encoding of the original pixels. The reference pixel buffer 3800 according to at least one example embodiment may be implemented with, but is not limited to, a volatile memory such as a DRAM and/or an SRAM.

Below, operations of the encoder 3000 will be more fully described with reference to FIGS. 4 to 7C. Operations to be described with reference to FIGS. 4 to 7C will be performed by the compressor 3400, but is not limited thereto.

Figure 4:
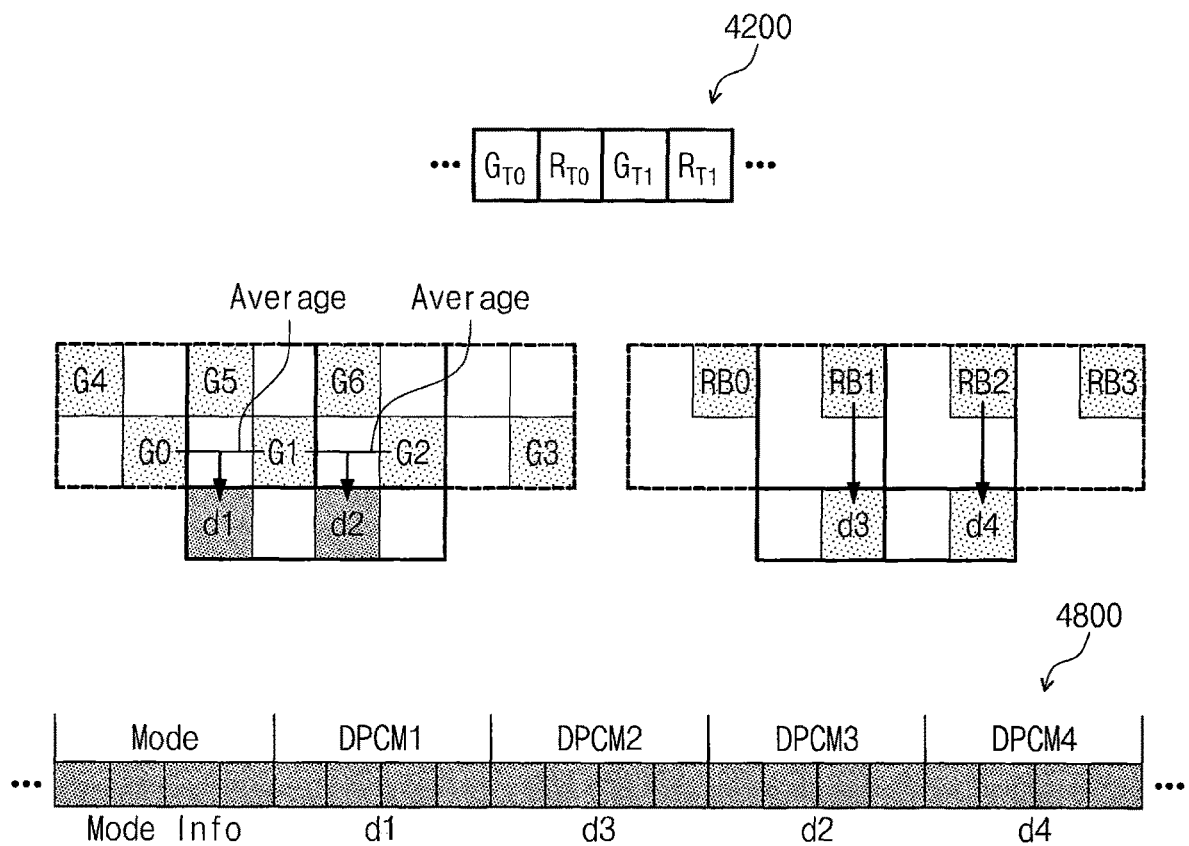
FIG. 4 is a diagram illustrating an operation in which an encoder encodes pieces of original pixel data based on a DPCM (Differential Pulse Code Modulation) mode according to at least one example embodiment.

FIG. 4 is a diagram illustrating an operation in which an encoder of FIG. 3 encodes pieces of original pixel data based on a DPCM mode according to at least one example embodiment.

In the DPCM mode, the encoder 3000 may encode original pixels 4200 based on a reference value determined from at least one reference pixel, but is not limited thereto. According to at least one example embodiment, pixels positioned on, for example, the upper two lines of the original pixels 4200 may be used as reference pixels, however the example embodiments are not limited thereto, and other pixels may be used as the reference pixels. The original pixels 4200 may include a first original pixel $G_{T0}$ being a green pixel, a second original pixel $R_{T0}$ being a red pixel, a third original pixel $G_{T1}$ being a green pixel, and a fourth original pixel $R_{T1}$ being a red pixel, but are not limited thereto. According to another example embodiment, the second original pixel $R_{T0}$ and the fourth original pixel $R_{T1}$ may be a blue pixel, etc. However, for convenience of description, it is assumed that the second original pixel $R_{T0}$ and the fourth original pixel $R_{T1}$ are a red pixel. The original pixels 4200 may be pixels before compression, but are not limited thereto. For example, a pixel value of each of the original pixels 4200 may be expressed by a value which is equal to or greater than "0" and is smaller than "1024".

Referring to a bitstream 4800 generated by the encoder 3000 by encoding the original pixels 4200, the bitstream 4800 may include a mode region for storing information (e.g., a bit string indicating the DPCM mode, etc.) about an encoding mode of the encoder 3000 used to generate the bitstream 4800, and pixel regions, e.g., DPCM1 to DMCM4, etc., for storing information about a pixel value related to pixels corresponding to the original pixels 4200. For example, the bitstream 4800 may be composed of a first pixel region DPCM1 for storing encoded data associated with the first original pixel $G_{T0}$, a second pixel region DPCM2 for storing encoded data associated with the second original pixel $R_{T0}$, a third pixel region DPCM3 for storing encoded data associated with the third original pixel $G_{T1}$, and a fourth pixel region DPCM4 for storing encoded data associated with the fourth original pixel $R_{T1}$, etc.

The mode region Mode may include M-bit data. Each of the first pixel region DPCM1, the second pixel region DPCM2, the third pixel region DPCM3, and the fourth pixel region DPCM4 may include N-bit data. "M" and "N" may be positive integers which are greater than "0". Below, it is assumed that "M" and "N" are "4", but the example embodiments are not limited thereto.

The encoder 3000 may store a difference value d1 between a pixel value of the first original pixel $G_{T0}$ and a reference value to the first pixel region DPCM1. According to at least one example embodiment, an average value of a pixel value of a reference pixel G0 positioned on a first location, e.g., the upper left side of the first original pixel $G_{T0}$, and a pixel value of a reference pixel G1 positioned on a second location, e.g., the upper right side thereof, may be used as a reference value, but the example embodiments are not limited thereto. That is, the difference value d1 stored to the first pixel region DPCM1 may be determined by the following Equation 1.

$$d1=(G0+G1)/2-G_{T0}$$ [Equation 1]

The encoder 3000 may store a difference value d3 between a pixel value of the second original pixel $R_{T0}$ and a reference value to the second pixel region DPCM2. According to at least one example embodiment, a pixel value of a reference pixel RB1 positioned on, e.g., the second line, above the second original pixel $R_{T0}$ may be used as a reference value. That is, the difference value d3 stored to the second pixel region DPCM2 may be determined by the following Equation 2.

$$d3=RB1-R_{T0}$$ [Equation 2]

The encoder 3000 may store a difference value d2 between a pixel value of the third original pixel $G_{T1}$ and a reference value. According to at least one example embodiment, an average value between a pixel value of a reference pixel G1 positioned on a first location, e.g., the upper left side of the third original pixel $G_{T1}$, and a pixel value of a reference pixel G2 positioned on a second location, e.g., the upper right side of the third original pixel $G_{T1}$, may be used as a reference value. That is, the difference value d2 stored to the third pixel region DPCM3 may be determined by the following Equation 3.

$$d2=(G1+G2)/2-G_{T1}$$ [Equation 3]

The encoder 3000 may store a difference value d4 between a pixel value of the fourth original pixel $R_{T1}$ and a reference value to the fourth pixel region DPCM4. According to at least one example embodiment, a pixel value of a reference pixel RB2 positioned on the second line above the fourth original pixel $R_{T1}$ may be used as a reference value. That is, the difference value d4 stored to the fourth pixel region DPCM4 may be determined by the following Equation 4.

$$d4=RB2-R_{T1}$$ [Equation 4]

Since each of the difference values, e.g., d1, d2, d3, and d4, etc., determined by Equation 1 to Equation 4 may be a negative value or a positive value, the most significant bit of each of the pixel regions DPCM1, DPCM2, DPCM3, and DPCM4 may be a sign bit indicating sign information. For example, in the case where the difference value d1 determined by Equation 1 is "−6", a bit string of "1110" including a sign bit of "1" indicating a negative value and a bit string of "110" indicating "6" may be stored to the first pixel region DPCM1.

Additionally, the encoder 3000 according to at least one example embodiment may perform a bit shift operation on each of the difference values d1, d2, d3, and d4, etc., determined by Equation 1 to Equation 4 based on the size of a relevant pixel region. For example, in the case where the number of bits assigned to the first pixel region DPCM1 is "4" and the difference value d1 is $16_{10}(10000_2)$, the encoder 3000 may store a bit string of "100", which is obtained by performing a right bit shift operation (">>") on the difference value d1 two times, to the first pixel region DPCM1 together with the signal bit of "0". The encoder 3000 may store information about the number of times that a shift operation is performed, to the mode region.

However, positions of pixels to be referenced for encoding of original pixels described with reference to FIG. 4 may be only one example embodiment and may be changed. For example, the encoder 3000 may not use reference pixels determined as a bad pixel by the bad pixel detector 3200 of FIG. 3 for the purpose of determining a reference value.

In the case of encoding the first original pixel $G_{T0}$, in the case where the reference pixel G0 is a bad pixel, the encoder 3000 may determine not an average value of the reference pixels G0 and G1, but rather a pixel value of the reference pixel G1 as the reference value. In the case where the reference pixels G0 and G1 are a bad pixel, a pixel value of a reference pixel G5 may be determined as a reference value. In the case where reference pixels G0, G1, and G5 are bad pixels, reference values may be determined based on at least one pixel value of reference pixels G4 and G6 positioned in a diagonal direction, etc.

In the case of encoding the second original pixel $R_{T0}$, for example, in the case where the reference pixel RB1 is a bad pixel, the encoder 3000 may sort reference pixels RB0, RB2, and RB3, etc., to select an intermediate value and may determine the selected intermediate value as a reference value.

FIG. 5A is a diagram illustrating an operation in which an encoder of FIG. 3 encodes pieces of original pixel data based on a first average mode, according to at least one example embodiment.

The encoder 3000 may encode original pixels 5220 based on a first average mode and may generate a bitstream 5300, but is not limited thereto.

Referring to the bitstream 5300, the bitstream 5300 may include a mode region 5340 including information (e.g., a bit string indicating the first average mode, etc.) about an encoding mode, a first pixel region 5360 for storing encoded data associated with the first original pixel $G_{T0}$ and the third original pixel $G_{T1}$ being a green pixel, and a second pixel region 5380 for storing encoded data associated with the second original pixel $R_{T0}$ and the fourth original pixel $R_{T1}$ being a red pixel, but the example embodiments are not limited thereto.

The encoder 3000 may store an average value of a pixel value of the first original pixel $G_{T0}$ and a pixel value of the third original pixel $G_{T1}$ to the first pixel region 5360. The encoder 3000 may perform a bit shift operation on the first average value depending on (and/or based on) the size of the first pixel region 5360. For example, in the case where the number of bits assigned to the first pixel region 5360 is "8" and the first average value is $488_{10}(=111101000_2)$, the encoder 3000 may perform a right bit shift operation (">>") on the first average value and may store "1111010" to the first pixel region 5360. In this case, since the pieces of encoded data associated with two original pixels $G_{T0}$ and $G_{T1}$ are the same as each other, the encoded data of the first and third original pixels $G_{T0}$ and $G_{T1}$ may be stored together in the first pixel region 5360.

The encoder 3000 may store a second average value of a pixel value of the second original pixel $R_{T0}$ and a pixel value of the fourth original pixel $R_{T1}$ to the second pixel region 5380. A bit shift operation may be performed on the second average value depending on the size of the second pixel region 5380, identically to the way to store the first average value to the first pixel region 5360.

The first average mode described with reference to FIG. 5A may be efficient when the upper side of the original pixels 5220 corresponds to a horizontal edge. In this case, since spatial correlation almost does not exist between reference pixels positioned on the upper side of the original pixels 5220, it may be more efficient to perform encoding by using the pixel values of the original pixels 5220 itself.

FIGS. 5B and 5C are diagrams illustrating an operation in which an encoder of FIG. 3 encodes pieces of original pixel data based on an average mode, according to another example embodiment.

FIG. 5B shows an operation in which the encoder 3000 encodes original pixels 5420 based on a second average mode and generates a bitstream 5500 according to at least one example embodiment, and FIG. 5C shows an operation in which the encoder 3000 encodes original pixels 5620 based on a third average mode and generates a bitstream 5700 according to at least one example embodiment. The encoding based on the second average mode and the third average mode may be especially efficient when a horizontal edge exists at the upper side of original pixels and a pixel included in an edge region is also present in the original pixels.

Referring to FIG. 5B, the fourth original pixel $RT_1$ of the original pixels 5420 may be a pixel included in an edge region. A bitstream 5500 may include a mode region 5520 including information (e.g., a bit string indicating the second average mode, etc.) about an encoding mode, a first pixel region 5540 for storing encoded data associated with the first original pixel $G_{T0}$ and the third original pixel $G_{T1}$, a second pixel region 5560 for storing encoded data associated with the second original pixel $R_{T0}$, and a third pixel region 5580 for storing encoded data associated with the fourth original pixel $R_{T1}$, but the example embodiments are not limited thereto.

The encoder 3000 may store an average value of a pixel value of the first original pixel $G_{T0}$ and a pixel value of the third original pixel $G_{T1}$ to the first pixel region 5540. However, since the fourth original pixel $R_{T1}$ corresponds to an edge component, spatial correlation almost does not exist between the second original pixel $R_{T0}$ and the fourth original pixel $R_{T1}$. Accordingly, in the case where an average value of the second original pixel $R_{T0}$ and the fourth original pixel $R_{T1}$ is used as encoded data, the information loss may be great. Accordingly, the encoder 3000 may respectively store a pixel value of the second original pixel $R_{T0}$ and a pixel value of the fourth original pixel $R_{T1}$ to the second pixel region 5560 and the third pixel region 5580 without separate conversion (e.g., a bit shift operation which is performed depending on the size of the second pixel region 5560 and the third pixel region 5580 is excluded).

Referring to FIG. 5C, the first original pixel $G_{T0}$ of the original pixels 5620 may correspond to an edge component according to at least one example embodiment. A bitstream 5700 may include a mode region 5720 including information (e.g., a bit string indicating the third average mode, etc.) about an encoding mode, a first pixel region 5740 for storing encoded data associated with the first original pixel $G_{T0}$, a second pixel region 5760 for storing encoded data associated with the third original pixel $G_{T1}$, and a third pixel region 5780 for storing encoded data associated with the second original pixel $R_{T0}$ and the fourth original pixel $R_{T1}$.

A method for encoding the original pixels 5620 based on the third average mode is similar to the method for encoding the original pixels 5420 based on the second average mode, which is described with reference to FIG. 5B. The difference is as follows. Since an edge component of the original pixels 5620 is the first original pixel $G_{T0}$, a pixel value of the first original pixel $G_{T0}$ and a pixel value of the third original pixel $G_{T1}$ may be respectively stored to the first pixel region 5740 and the second pixel region 5760 without separate conversion (e.g., a bit shift operation which is performed depending on the size of the first pixel region 5740 and the second pixel region 5760 is excluded). For example, the encoder 3000 may store an average value of a pixel value of the second original pixel $R_{T0}$ and a pixel value of the fourth original pixel $R_{T1}$ to the third pixel region 5780.

According to at least one example embodiment, the encoder 3000 may handle the second average mode described with reference to FIG. 5B and the third average mode described with reference to FIG. 5C as the same encoding mode and may include an additional bit for distinguishing the second average mode from the third average mode in the generated bitstream. For example, the mode region 5520 of the bitstream 5500 and the mode region 5720 of the bitstream 5700 may include an additional region for indicating sub mode information, but is not limited thereto. The encoder 3000 may distinguish the second average mode from the third average mode by recording a value, e.g., of "0" or "1" in the additional region. In this case, the size of each of pixel regions of the bitstream 5500 and the bitstream 5700 may decrease due to the additional region for indicating the sub mode information.

FIG. 6 is a table illustrating information about encoding modes to be used in an image processing apparatus of FIG. 1, according to at least one example embodiment.

Referring to a table 6000, encoding modes may include the DPCM mode described with reference to FIG. 4, the average mode described with reference to FIGS. 5A to 5C, and/or a pulse code modulation (PCM) mode, but the example embodiments are not limited thereto. For example, 13 encoding modes, e.g., Mode 0 to Mode 12, are stored in a first column Mode of the table 6000, but the example embodiments are not limited thereto. Encoding methods DPCM, Average, and/or PCM, etc., which are used in the 13 encoding modes are stored in a second column Method but the example embodiments are not limited thereto. The number of times that a bit shift operation is performed to store a difference value and/or an average value associated with a pixel value, e.g., a green pixel, is stated at a third column Shift G. The number of times that a bit shift operation is performed to store a difference value and/or an average value associated with a red or blue pixel is recorded at a fourth column Shift RB, etc.

The table 6000 defines a protocol between the encoder 3000 and the decoder 1600. That is, the table 6000 indicates information desired and/or necessary for the decoder 1600 to generate a reconstruction pixel based on a bitstream received from the encoder 1400. Pieces of information recorded in the table 6000 may be experimentally obtained values.

For example, the encoder 1400 may compress original pixels based on Mode 4 of the table 6000 and may record "4" in a mode region of the generated bitstream. The decoder 1600 may parse "4" from the mode region of the bitstream received from the encoder 1400. The decoder 1600 may determine that the current original pixels are compressed in the DPCM mode based on the values stored in Method column (e.g., category) of the table 6000, and the decoder 1600 may determine that a difference value of a green pixel stored in each of a first pixel region and a third pixel region is a result value obtained by performing a bit shift operation three times based on the Shift G column (e.g., category) of the table 6000. Also, the decoder 1600 may determine that a difference value of a red/blue pixel stored in each of a second pixel region and a fourth pixel region is a result value obtained by performing a bit shift operation three times based on the Shift R/B column (e.g., category) of the table 6000.

For example, the encoder 1400 may compress the original pixels based on Mode 10 of the table 6000 and may record "10" in a mode region of the generated bitstream. The decoder 1600 may determine that current original pixels are compressed in the average mode and an average value of green pixels stored in the first pixel region is a result value obtained by performing a bit shift operation two times from the table 6000. Also, the decoder 1600 may determine that an average value of a red/blue pixel stored in the second pixel region is a result value obtained by performing a bit shift operation two times.

According to at least one example embodiment, Mode 12 of the table 6000 may indicate the PCM mode, but the example embodiments are not limited thereto. The PCM mode may be a mode of including only the upper bit values in a bitstream suitably for the size of a relevant pixel region, without sequentially converting the pixel values of current original pixels. The encoder 1400 according to at least one example embodiment may attempt encoding by using Mode 0 to Mode 12 sequentially, and may perform encoding based on the PCM mode when Mode 1 to Mode 12 all fail, but the example embodiments are not limited thereto.

Figure 7:
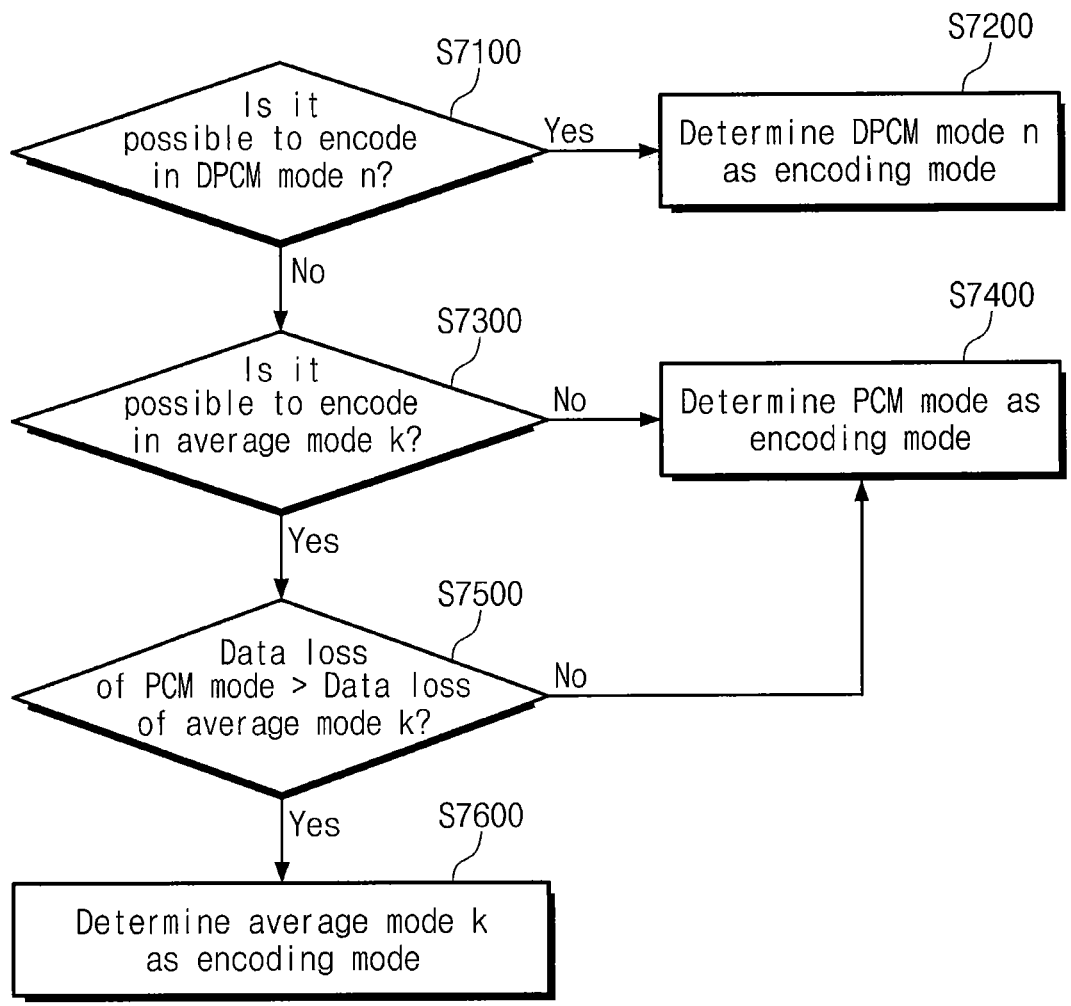
FIG. 7 is a flowchart illustrating a method in which an encoder of FIG. 3 determines an encoding mode for pieces of original pixel data among encoding modes illustrated in FIG. 6, according to at least one example embodiment.

FIG. 7 is a flowchart illustrating a method in which an encoder of FIG. 3 determines an encoding mode for pieces of original pixel data among encoding modes illustrated in FIG. 6, according to at least one example embodiment.

In operation S7100, the encoder 3000 may determine whether to encode original pixels based on the DPCM mode. For example, the encoder 3000 may sequentially determine whether to encode original pixels based on various modes corresponding to DPCM, e.g., Mode 1 to Mode 9 in the table 6000 of FIG. 6. That is, in the case where encoding is possible in a current mode (Yes), the encoder 3000 may determine a current DPCM mode "Mode n" (e.g., n being any one of 1 to 9) as an encoding mode; if not (No), the encoder 3000 may determine whether encoding is possible in a next DPCM mode. Since the number of times of a bit shift operation increases when progressing toward Mode 9 from Mode 1, the loss of original data due to compression may occur less when encoding is performed in a mode having a smaller number (e.g., compression using Mode 1 may result in less loss/error than compression of original data using Mode 9, etc.).

For example, the encoder 3000 may determine whether to encode the original pixels based on Mode 0 in the table 6000 of FIG. 6. Referring to the table 6000, a bit shift operation is not performed in Mode 0. Accordingly, in the case where any one of the difference value d1 associated with the first original pixel $G_{T0}$, the difference value d2 associated with the second original pixel $R_{T0}$, the difference value d3 associated with the third original pixel $G_{T1}$, and the difference value d4 associated with the fourth original pixel $R_{T1}$, is not expressed within a given bit set (e.g., four bits) set to the size of a pixel region, the encoder 3000 may determine that it is difficult, undesirable, and/or impossible to encode the original pixels using Mode 0. That is, in the case where it is determined that Mode 0 is usable, the encoder 3000 may determine Mode 0 as an encoding mode for the original pixels; however, in the case where it is determined that Mode 0 is unusable, the encoder 3000 may determine whether to use a next DPCM mode (i.e., Mode 1).

In the case where it is determined based on the DPCM mode that encoding of the original pixels is difficult, undesirable, and/or impossible (No), in operation S7300, the encoder 3000 may determine whether to encode the original pixels based on the average mode. For example, the encoder 3000 may sequentially determine whether to encode the original pixels currently based on, e.g., Mode 10 and Mode 11, in the table 6000 of FIG. 6. In the case where it is determined that encoding is currently possible in the average mode "Mode k" (e.g., k being 10 or 11, etc.), in operation S7500, the encoder 3000 may perform an additional test operation. However, in the case where encoding is difficult, undesirable, and/or impossible even though any mode of Mode 10 and Mode 11 is used (No), in operation S7400, the encoder 3000 may determine the PCM mode as an encoding mode for the original pixels.

In operation S7500, the encoder 3000 may compare the degree of data loss due to compression of the average mode "Mode k", which is determined in operation S73000 as encoding may be possible, and the degree of data loss due to compression of the PCM mode. As described above, a bit shift operation may be performed depending on the size of a pixel region assigned to a bitstream, and the encoder 3000 may compare the levels of data loss by comparing the number of times that a bit shift operation is performed in the average mode "Mode k" and the number of times that a bit shift operation is performed in the PCM mode. In the case where the level of data loss in the PCM mode is greater than the level of data loss in the average mode "Mode k" determined in operation S7300 (Yes), the encoder 3000 may determine the average mode "Mode k" determined in operation S7300 as an encoding mode for the original pixels (S7600). In the case where the level of data loss in the PCM mode is not greater than the level of data loss in the average mode Mode k determined in operation S7300 (No), the encoder 3000 may determine the PCM mode as an encoding mode for the original pixels (S7400).

Figure 8:
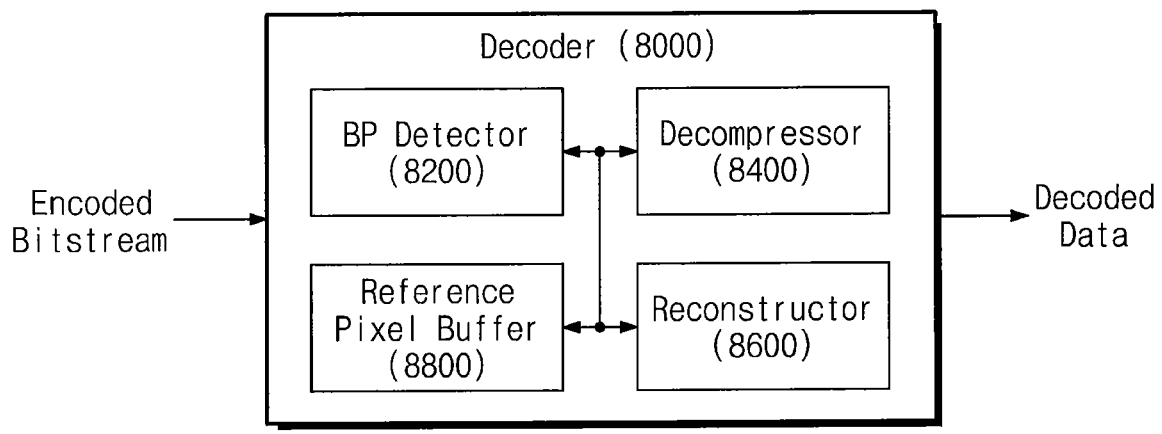
FIG. 8 is a block diagram illustrating a decoder according to at least one example embodiment.

FIG. 8 is a block diagram illustrating a decoder according to at least one example embodiment.

A decoder 8000 corresponds to a detailed example embodiment of the decoder 1600 of FIG. 1, but is not limited thereto. Accordingly, even though omitted below, the above description given with regard to the decoder 1600 of FIG. 1 may be applied to the decoder 8000 of FIG. 8, etc. It may be easily understood to ordinary those that an operation corresponding to the encoder 3000 of FIG. 3 may be performed in the decoder 8000.

Referring to FIG. 8, the decoder 8000 may include a bad pixel detector 8200, a decompressor 8400, a reconstructor 8600, and/or a reference pixel buffer 8800, but is not limited thereto. The decoder 8000 may include at least one central processor (not illustrated) which controls the bad pixel detector 8200, the decompressor 8400, the reconstructor 8600, and/or the reference pixel buffer 8800, etc. Additionally, each of the bad pixel detector 8200, the decompressor 8400, the reconstructor 8600, and/or the reference pixel buffer 8800 may be operated by their own processor (not illustrated), and the decoder 8000 may be overall operated as the processors (not illustrated) operate mutually and/or in a parallel or distributed manner. Additionally, the bad pixel detector 8200, the decompressor 8400, the reconstructor 8600, and/or the reference pixel buffer 8800 may be controlled under the control of one or more external processors (not illustrated) of the decoder 8000.

The bad pixel detector 8200, the reconstructor 8600, and/or the reference pixel buffer 8800 correspond to the bad pixel detector 3200, the reconstructor 3600, and/or the reference pixel buffer 3800 of FIG. 3, and thus, additional description will be omitted to avoid redundancy.

The decompressor 8400 may determine an encoding mode from a bitstream received from the encoder 3000 of FIG. 3, and may generate pieces of reconstruction pixel data based on the determined encoding mode, but is not limited thereto. According to at least one example embodiment, the decompressor 8400 may parse information included in a mode region of the received bitstream and may determine an encoding mode for original pixels based on the parsed information, but is not limited thereto.

Below, operations of the decoder 8000 will be more fully described with reference to FIGS. 9 to 11 according to at least one example embodiment. Operations to be described with reference to FIGS. 9 to 11 will be performed by the decompressor 8400 according to at least one example embodiment.

Figure 9:
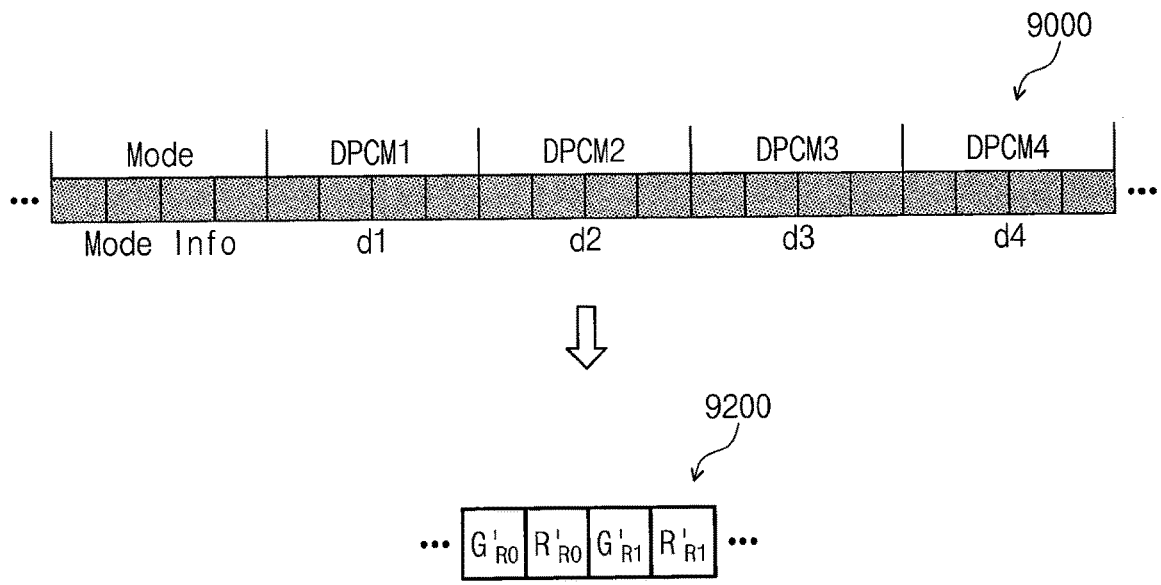
FIG. 9 is a diagram illustrating an operation in which a decoder of FIG. 8 decodes pieces of original pixel data based on a DPCM mode, according to at least one example embodiment.

FIG. 9 is a diagram illustrating an operation in which a decoder of FIG. 8 decodes original pixels based on a DPCM mode, according to at least one example embodiment.

The decoder 8000 may determine an encoding mode for original pixels as the DPCM mode with reference to a mode region Mode of a received bitstream 9000. For example, it is assumed that an encoding mode is determined as Mode 1 of FIG. 6, but is not limited thereto.

The decoder 8000 may generate a first reconstruction pixel $G_{R0}$ associated with, for example, the first original pixel $G_{R0}$ by using a first difference value d1 read from the first pixel region DPCM1 and a reference value. In the DPCM mode, since a green pixel is encoded by using, as a reference value, an average value of a pixel value of a reference pixel positioned on a first location, e.g., the upper left side of an original pixel, and a pixel value of a reference pixel positioned on a second location, e.g., the upper right side thereof, the decoder 8000 may read information about the reference pixel from the reference pixel buffer 8800 and may determine the reference value based on the read reference pixel information corresponding to the first location and the second location. That is, the decoder 8000 may determine a value of the first reconstruction pixel $G_{R0}$ by using the following Equation 5.

$$G'_{R0}=(G0+G1)/2-d1\ (G0\ \text{and}\ G1:\ \text{reference pixel}) \quad \text{[Equation 5]}$$

The decoder 8000 may generate a reconstruction pixel $R'_{R0}$ associated with the second original pixel $R_{R0}$ by using the second difference value d2 read from the second pixel region DPCM2 and a reference value. In the DPCM mode, since a red or blue pixel is encoded by using a pixel value of a reference pixel positioned on, e.g., an upper two lines of the original pixel as a reference value, the decoder 8000 may read information about the reference pixel from the reference pixel buffer 8800 and may determine the reference value based on the read reference pixel information. That is, the decoder 8000 may determine a value of the second reconstruction pixel $R'_{R0}$ by using the following Equation 6.

$$R'R0=RB1-d2\ (RB1:\ \text{reference pixel}) \quad \text{[Equation 6]}$$

The decoder 8000 may respectively read the third difference value d3 and the fourth difference value d4 from the third pixel region DPCM3 and the fourth pixel region DPCM4 and may generate a third reconstruction pixel $G'_{R1}$ and a fourth reconstruction pixel $R'_{R1}$ by using the read values and a reference value. A method in which the decoder 8000 generates the third reconstruction pixel $G'_{R1}$ and the fourth reconstruction pixel $R'_{R1}$ is the same as the method in which the decoder 8000 generates the first reconstruction pixel $G'_{R0}$ and the second reconstruction pixel $R'_{R0}$, and thus, additional description will be omitted to avoid redundancy.

According to at least one example embodiment, the decoder 8000 may perform a bit shift operation, in an opposite direction to a bit shift operation which the encoder 3000 performs a bit shift operation on each of the difference values d1, d2, d3, and d4, etc., read from pixel regions.

For example, in the case where an encoding mode is determined as Mode 3 of FIG. 6, the decoder 8000 may perform a left bit shift operation ("<<") (e.g., the opposite direction bit shift operation than the bit shift operation performed by the encoder) on the first difference value d1 read from the first pixel region DPCM1 and the third difference value d3 read from the third pixel region DPCM3 two times, and may generate the first reconstruction pixel $G_{R0}$ and the third reconstruction pixel $G'_{R1}$ based on result values of the left bit shift operation. The decoder 8000 may perform a left bit shift operation ("<<") on the second difference value d2 read from the second pixel region DPCM2 and the fourth difference value d4 read from the fourth pixel region DPCM4 three times and may generate the second reconstruction pixel $R'_{R0}$ and the fourth reconstruction pixel $R'_{R1}$ based on result values of the left bit shift operation.

Figure 10:
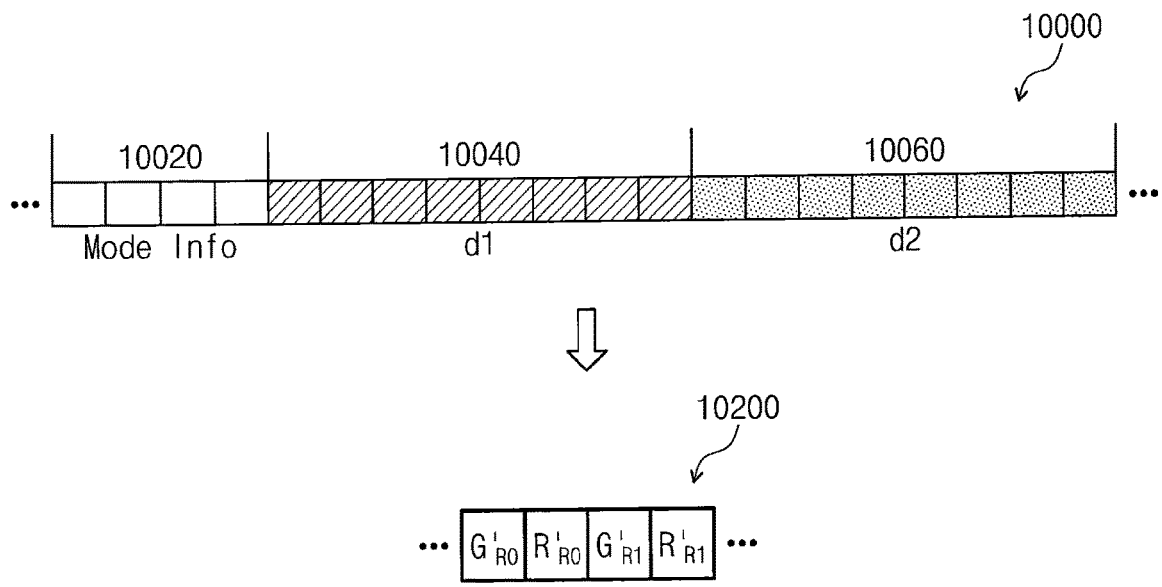
FIG. 10 is a diagram illustrating an operation in which a decoder of FIG. 8 decodes pieces of original pixel data based on an average mode, according to at least one example embodiment.

FIG. 10 is a diagram illustrating an operation in which a decoder of FIG. 8 decodes original pixels based on an average mode, according to at least one example embodiment.

The decoder 8000 may determine an encoding mode for original pixels as the average mode with reference to a mode region 10020 of a received bitstream 10000, but is not limited thereto.

The decoder 8000 may determine a first average value d1 read from a first pixel region 10040 as a pixel value of the first reconstruction pixel $G_{R0}$ and the third reconstruction pixel $G'_{R1}$.

The decoder 8000 may determine a second average value d2 read from a second pixel region 10060 as a pixel value of the second reconstruction pixel $R'_{R0}$ and the fourth reconstruction pixel $R'_{R1}$.

As in the DPCM mode, the decoder 8000 according to at least one example embodiment may perform a left bit shift operation ("<<") on each of the first average value d1 read from the first pixel region 10040 and the second average value d2 read from the second pixel region 10060, based on information read from the mode region 10020.

For example, in the case where an encoding mode is determined as Mode 10 of FIG. 6, the decoder 8000 may determine a value, which is obtained by performing a left bit shift operation ("<<") on the first average value d1 two times, as a pixel value of the first reconstruction pixel $G_{R0}$ and the third reconstruction pixel $G'_{R1}$, and may determine a value, which is obtained by performing a left bit shift operation ("<<") on the second average value d2 two times, as a pixel value of the second reconstruction pixel $R'_{R0}$ and the fourth reconstruction pixel $R'_{R1}$.

Figure 11:
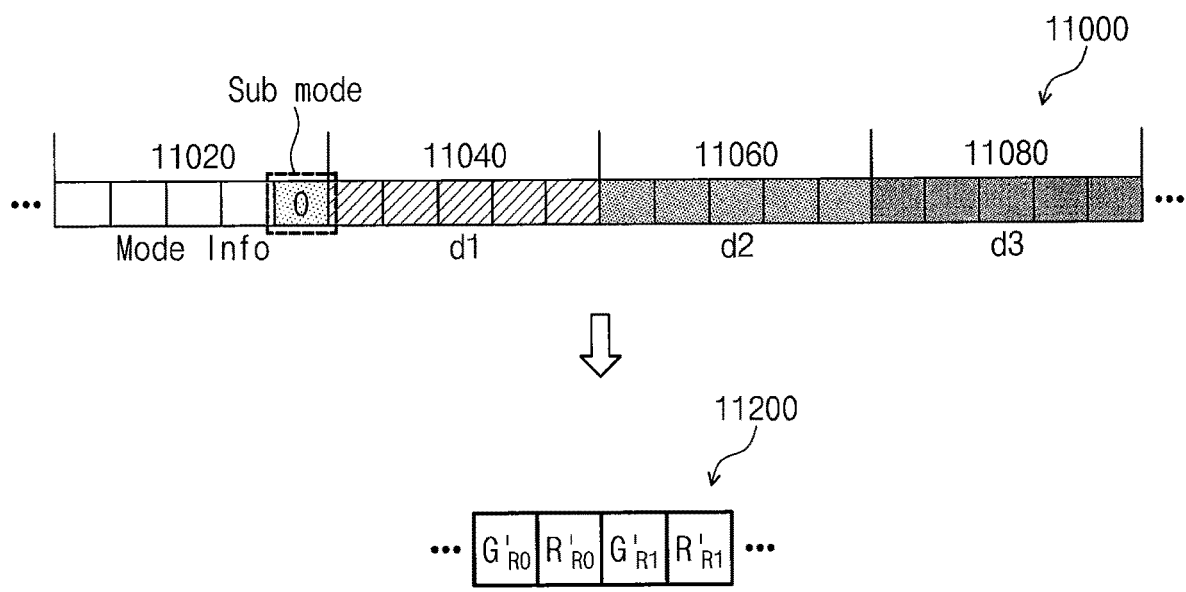
FIG. 11 is a diagram illustrating an operation in which a decoder of FIG. 8 decodes pieces of original pixel data based on an average mode, according to at least one other example embodiment.

FIG. 11 is a diagram illustrating an operation in which a decoder of FIG. 8 decodes original pixels based on an average mode, according to another example embodiment.

The decoder 8000 may determine an encoding mode for original pixels as the average mode with reference to a mode region 11020 of a received bitstream 11000. For example, it is assumed that an encoding mode is determined as Mode 11 of FIG. 6, but the example embodiments are not limited thereto. According to at least one example embodiment, in the case where an additional region Sub mode is included in the mode region 11020 including mode information, the decoder 8000 may determine an encoding mode as Mode 11, etc.

As described with reference to FIGS. 5B and 5C, a decoding method may be differently determined depending (e.g., based) on a value read from the additional region Sub mode. For example, in the case where a value read from the additional region Sub mode is "0" may indicate that an edge component is present in a right pixel of original pixels, and the case where a value read from the additional region Sub mode is "1" may indicate that an edge component is present in a left pixel of the original pixels, but is not limited thereto.

According to at least one example embodiment, in the case where a value read from the additional region Sub mode is "0", depending on the number of times of a bit shift operation defined in the table 6000 of FIG. 6, the decoder 8000 may determine a value, which is obtained by performing a left bit shift operation ("<<") on a value d1 read from a first pixel region 11040 five times, as a pixel value of the first reconstruction pixel $G'_{R0}$ and a pixel value of the third reconstruction pixel $G'_{R1}$. The decoder 8000 may determine a value, which is obtained by performing a left bit shift operation ("<<") on a value d2 read from a second pixel region 11060 five times, as a pixel value of the second reconstruction pixel $R'_{R0}$. Also, the decoder 8000 may determine a value, which is obtained by performing a left bit shift operation ("<<") on a value d3 read from a third pixel region 11080 five times, as a pixel value of the second reconstruction pixel $R'_{R1}$.

According to at least one example embodiment, in the case where a value read from the additional region Sub mode is "1", depending on the number of times of a bit shift operation defined in the table 6000 of FIG. 6, the decoder 8000 may determine a value, which is obtained by performing a left bit shift operation ("<<") on the value d1 read from the first pixel region 11040 five times, as a pixel value of the first reconstruction pixel $G'_{R0}$. The decoder 8000 may determine a value, which is obtained by performing a left bit shift operation ("<<") on the value d2 read from the second pixel region 11060 five times, as a pixel value of the third reconstruction pixel $G'_{R1}$. Also, the decoder 8000 may determine a value, which is obtained by performing a left bit shift operation ("<<") on the value d3 read from the third pixel region 11080 five times, as a pixel value of the second reconstruction pixel $R'_{R0}$ and a pixel value of the fourth reconstruction pixel $R'_{R1}$.

Figure 12:
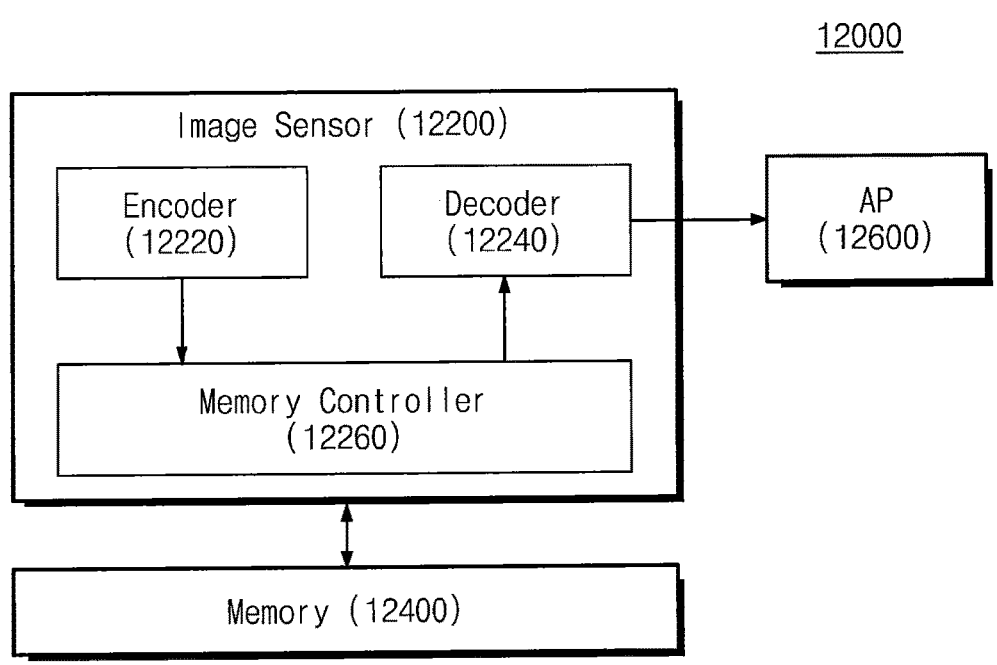
FIG. 12 is a block diagram illustrating an image processing apparatus according to at least one example embodiment.

FIG. 12 is a block diagram illustrating an image processing apparatus according to at least one example embodiment.

An image processing apparatus 12000 corresponds to a detailed example embodiment of the image processing apparatus 1000 of FIG. 1, but is not limited thereto. Accordingly, even though omitted below, the above description given with regard to the image processing apparatus 1000 of FIG. 1 may be applied to the image processing apparatus 12000.

Referring to FIG. 12, the image processing apparatus 12000 may include an image sensor 12200, a memory 12400, and/or an application processor 12600, etc., but the example embodiments are not limited thereto.

The image sensor 12200 may be an electronic part which extracts color information from a light signal so as to be implemented in a display (e.g., a display panel, a display device, a projector, etc.). The image sensor 12200 may include an encoder 12220, a decoder 12240, and/or a memory controller 12260, etc., but is not limited thereto. The image sensor 12200 is also called a "3 stack sensor".

The encoder 12220 may perform the operation of the encoder 1400 described with reference to FIGS. 1 to 7 according to at least one example embodiment. That is, the encoder 12220 may encode original pixels of a received Bayer pattern based on, for example, the DPCM mode and the average mode, etc., and may generate a bitstream including encoded data. The bitstream generated by the encoder 12220 may be provided to the memory controller 12260.

The memory controller 12260 may control an operation of inputting and outputting the encoded data. The bitstream generated by the encoder 12220 may be input to the memory 12400 under the control of the memory controller 12260. The memory controller 12260 may include a dedicated logic circuit (e.g., FPGA or ASICs, etc.) which performs various operations for controlling overall operations in the memory 12400.

The memory 12400 may be connected to the image sensor 12200 and may store image frames. The memory 12400 may store not original data associated with image frames but pieces of encoded data generated by the encoder 12220. Accordingly, the number of image frames which may be stored to the memory 12400 may greatly increase compared to the case of storing original data to the memory 12400. The memory 12400 may include a volatile memory such as a DRAM and/or an SRAM, etc., and/or a nonvolatile memory such as a flash memory, a PRAM, an MRAM, a ReRAM, and/or an FRAM, etc.

The memory 12400 may output a bitstream including encoded data to the decoder 12240 under the control of the memory controller 12260. The decoder 12240 may perform the operation of the decoder 1600 described with reference to FIGS. 1 and 8 to 12 according to at least one example embodiment. That is, the decoder 12240 may read information about an encoding mode from the bitstream received from the memory controller 12260 and may generate reconstruction image data based on the read encoding mode.

The application processor 12600 may apply various image processing techniques based on image data received from the image sensor 12200. The application processor 12600 may correspond to the application processor 1800 of FIG. 1, but is not limited thereto, and thus, additional description will be omitted to avoid redundancy.

Figure 13:
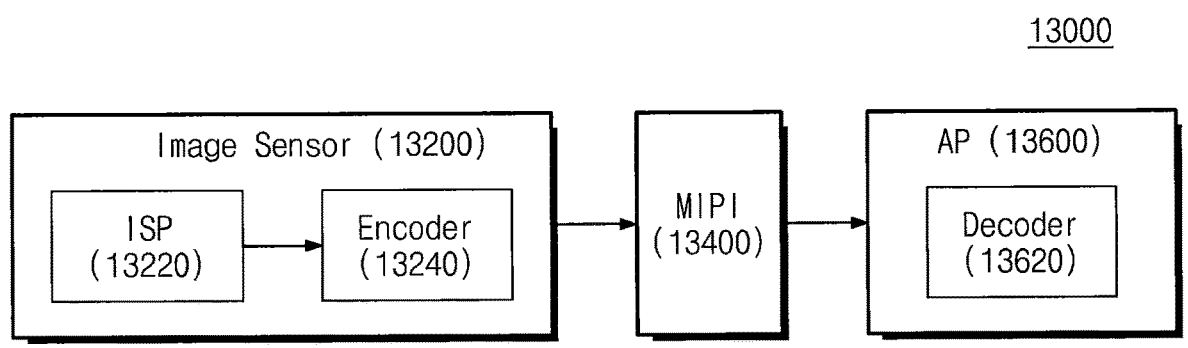
FIG. 13 is a block diagram illustrating an image processing apparatus according to at least one example embodiment.

FIG. 13 is a block diagram illustrating an image processing apparatus according to at least one example embodiment.

An image processing apparatus 13000 corresponds to at least one example embodiment, such as the image processing apparatus 1000 of FIG. 1. Accordingly, even though omitted below, the above description given with regard to the image processing apparatus 1000 of FIG. 1 may be applied to the image processing apparatus 13000.

Referring to FIG. 13, the image processing apparatus 13000 may include an image sensor 13200, an MIPI (Mobile Industry Processor Interface) 13400, and/or an application processor 13600, etc., but the example embodiments are not limited thereto. The image sensor 13200 is also called a "2 stack sensor".

The image sensor 13200 may include an image signal processor (ISP) 13220 and an encoder 13240. The ISP 13220 may perform pre-processing on original image data of a Bayer pattern. The pre-processing may mean applying various image improvement algorithms which may improve the quality of image data. The pre-processed image data may be provided to the encoder 13240.

The encoder 13240 may encode original image data of a Bayer pattern received from the ISP 13220 and may output a bitstream including encoded data. The encoder 13240 may perform the operation of the encoder 1400 described with reference to FIGS. 1 to 7 according to at least one example embodiment, but is not limited thereto. That is, the encoder 13240 may encode received original pixels based on the DPCM mode and the average mode and may generate a bitstream, etc. The bitstream generated by the encoder 13240 may be provided to the MIPI 13400.

The MIPI 13400 which is an intermediate interface between the image sensor 13200 and the application processor 13600 may be an electronic part implemented with a circuit which may transmit an electrical signal. The MIPI 13400 may perform an interface operation for transmitting the received bitstream to the application processor 13600. The MIPI 13400 may provide the bitstream received from the encoder 13240 to the application processor 13600. Accordingly, the image processing apparatus 13000 may greatly increase the number of image frames which are transmitted between the image sensor 13200 and the application processor 13600 per second, by transmitting encoded data instead of transmitting original data associated with image frames from the image sensor 13200 to the application processor 13600.

The application processor 13600 may receive the bitstream including the encoded data from the MIPI 13400. The application processor 13600 may include a decoder 13620 for decoding the received bitstream. That is, the decoder 13620 may read information about an encoding mode from the bitstream received from the MIPI 13400 and may generate reconstruction image data based on the read encoding mode. The application processor 13600 may apply various image processing techniques to the reconstruction image data.

An image processing apparatus according to at least one example embodiment of the inventive concepts may perform compression on original Bayer image. As the size of image data decreases through the compression, efficiency associated with a memory space and a bandwidth of the image processing apparatus may be improved.

While the inventive concepts has been described with reference to various example embodiments thereof, it will be apparent to those of ordinary skill in the art that various changes and modifications may be made thereto without departing from the spirit and scope of the example embodiments of the inventive concepts as set forth in the following claims.

What is claimed is:

1. An image encoding apparatus comprising:
at least one processor configured to,
receive one or more original pixels; and
generate a compressed bitstream including encoded data corresponding to values of the one or more original pixels, based on an encoding mode selected from a plurality of encoding modes, the generating including,
generating the compressed bitstream based on a difference value between each of the values of the original pixels and a reference value, the reference value is based on at least one of the values of one or more reference pixels previously encoded and reconstructed, in response to the encoding mode being a first mode of the plurality of encoding modes,
generating the compressed bitstream based on an average value of at least two of the values of the original pixels in response to the encoding mode being a second mode of the plurality of encoding modes,
storing the difference value or the average value in a pixel region of the compressed bitstream, and
performing a bit shift operation on the difference value or the average value based on a size of the pixel region.

2. The image encoding apparatus of claim 1, wherein
the at least one processor is further configured to determine one of the first mode and the second mode as the encoding mode for the values of the one or more original pixels; and
the compressed bitstream includes a mode region for storing information related to the determined encoding mode.

3. The image encoding apparatus of claim 2, wherein
the at least one processor is further configured to obtain the values of the one or more original pixels using a Bayer color filter, the values of the one or more original pixels including at least a value of a first pixel, a value of a second pixel, a value of a third pixel, and a value of a fourth pixel; and
the first pixel and the second pixel are a green pixel, and the third pixel and the fourth pixel are a red or blue pixel.

4. The image encoding apparatus of claim 3, wherein,
in the first mode, the at least one processor is configured to store a first difference value between the value of the first pixel and an average value of a value of a first reference pixel and a value of a second reference pixel, and a second difference value between the value of the second pixel and an average value of a value of a third reference pixel and a value of a fourth reference pixel, in the pixel region; and
the first reference pixel and the second reference pixel are positioned on a upper line of the first pixel, and the third reference pixel and the fourth reference pixel are positioned on a upper line of the second pixel.

5. The image encoding apparatus of claim 3, wherein,
in the first mode, the at least one processor is configured to store a third difference value between a value of a fifth reference pixel and the value of the third pixel, and a fourth difference value between a value of a sixth reference pixel and the value of the fourth pixel, in the pixel region; and the fifth reference pixel is positioned on the second line above the third pixel, and the sixth reference pixel is positioned on the second line above the fourth pixel.

6. The image encoding apparatus of claim 1, wherein the at least one processor is further configured to:

detect a bad pixel from the values of the one or more reference pixels, and wherein, in the first mode, a value of the bad pixel is not used as the reference value.

7. The image encoding apparatus of claim 3, wherein, in the second mode, the at least one processor is further configured to store at least one of a first average value of the value of the first pixel and the value of the second pixel, and a second average value of the value of the third pixel and the value of the fourth pixel, in the pixel region.

8. The image encoding apparatus of claim 2, wherein the at least one processor is further configured to:

store information regarding the number of times that the bit shift operation is performed in the mode region.

9. The image encoding apparatus of claim 1, wherein the at least one processor is further configured to determine one of the first mode and the second mode as the encoding mode for the values of the one or more original pixels based on whether a pixel of the original pixels and the one or more reference pixels is included in an edge region of a Bayer color filter.

10. An image decoding apparatus comprising:

at least one processor configured to, receive a bitstream including, an encoding mode selected from a plurality of encoding modes, and a pixel region storing a difference value or an average value, the difference value or the average value having been bit shifted a number of times based on a size of the pixel region; and generate values of one or more reconstruction pixels corresponding to values of one or more original pixels based on the received bitstream, the generating including, decoding the bitstream based on the difference value included in the bitstream and a reference value, the reference value is based on at least one value of one or more previously decoded reference pixels, in response to the encoding mode being a first mode of the plurality of encoding modes, decoding the bitstream based on the average value received from the bitstream in response to the encoding mode being a second mode of the plurality of encoding modes, and the difference value indicating a difference between each of the values of the one or more original pixels and the reference value, and the average value being a value obtained by averaging at least two of the values of the one or more original pixels.

11. The image decoding apparatus of claim 10, wherein the bitstream includes a mode region for storing information indicating one of the first mode and the second mode; and the at least one processor is further configured to determine the encoding mode for the values of the original pixels based on the mode region of the bitstream.

12. The image decoding apparatus of claim 11, wherein the at least one processor is further configured to obtain the values of the one or more original pixels using a Bayer color filter, the values of the one or more original pixels include at least a value of a first pixel, a value of a second pixel, a value of a third pixel, and a value of a fourth pixel;

the first pixel and the second pixel are a green pixel, and the third pixel and the fourth pixel are a red or blue pixel; and the one or more reconstruction pixels include a first reconstruction pixel corresponding to the first pixel, a second reconstruction pixel corresponding to the second pixel, a third reconstruction pixel corresponding to the third pixel, and a fourth reconstruction pixel corresponding to the fourth pixel.

13. The image decoding apparatus of claim 12, wherein in response to the determined encoding mode indicating the first mode, the at least one processor is configured to, determine a value of the first reconstruction pixel based on a first difference value read from the pixel region and an average value of a value of a first reference pixel and a value of a second reference pixel, and determine a value of the second reconstruction pixel based on a second difference value read from the pixel region and an average value of a value of a third reference pixel and a value of a fourth reference pixel; and the first reference pixel and the second reference pixel are positioned on a upper line of the first pixel, and the third reference pixel and the fourth reference pixel are positioned on a upper line of the second pixel.

14. The image decoding apparatus of claim 13, wherein in response to the determined encoding mode indicating the first mode, the at least one processor is further configured to, determine a value of the third reconstruction pixel based on a third difference value read from the pixel region and a fifth reference pixel, and determine a value of the fourth reconstruction pixel based on a fourth difference value read from the pixel region and a sixth reference pixel; and the fifth reference pixel is positioned on the second line above the third pixel, and the sixth reference pixel is positioned on the second line above the fourth pixel.

15. The image decoding apparatus of claim 12, wherein in response to the determined encoding mode indicating the second mode, the at least one processor is further configured to:

determine a first average value read from the pixel region as the value of the first pixel and the value of the second pixel; and determine a second average value read from the pixel region as the value of the third pixel and the value of the fourth pixel.

16. The image decoding apparatus of claim 11, wherein the at least one processor is further configured to:

determine a number of times to perform a bit shift operation on the difference value or the average value read from the pixel region;

perform the bit shift operation on the difference value or the average value read from the pixel region; and perform decoding based on the difference value or the average value obtained by performing the bit shift operation.

17. The image decoding apparatus of claim 10, wherein the at least one processor is further configured to:

detect a bad pixel from the values of current reference pixels, and in response to the encoding mode indicating the first mode, not using a value of the bad pixel as the reference value.

18. An image sensor connected with an memory comprising:
- an encoder configured to generate encoded data corresponding to values of original pixels of a Bayer color pattern based on one of encoding modes;
- a memory controller configured to control an operation of inputting and outputting the encoded data to and from the memory; and
- a decoder configured to generate values of reconstruction pixels corresponding to the values of the original pixels by decoding the encoded data output from the memory, wherein
- in a first mode of the encoding modes, the encoder is further configured to generate the encoded data based on a difference value between each of the values of the original pixels and a reference value which is based on at least one of the values of the reference pixels previously encoded and reconstructed,
- in a second mode of the encoding modes, the encoder is further configured to generate the encoded data based on an average value of at least two of the values of the original pixels, and
- the encoder is further configured to store the difference value or the average value in a pixel region of the generated encoded data, and perform a bit shift operation on the difference value or the average value based on a size of the pixel region.

19. The image sensor of claim 18, wherein the encoder determines one of the first mode and the second mode as an encoding mode for the values of the original pixels based on whether a pixel of the original pixels and the reference pixels is included in an edge region of a whole image, and
- wherein the encoder includes information related to the determined encoding mode, in the encoded data.

20. The image sensor of claim 18, wherein the decoder determines one of the first mode and the second mode as an encoding mode for the values of the original pixels based on information parsed from the encoded data, and
- wherein the decoder generates the values of the reconstruction pixels based on the determined encoding mode.

* * * * *